(12) United States Patent
Winkelmann et al.

(10) Patent No.: US 11,681,567 B2
(45) Date of Patent: Jun. 20, 2023

(54) METHOD AND PROCESSOR SYSTEM FOR EXECUTING A TELT INSTRUCTION TO ACCESS A DATA ITEM DURING EXECUTION OF AN ATOMIC PRIMITIVE

(71) Applicant: INTERNATIONAL BUSINESS MACHINES CORPORATION, Armonk, NY (US)

(72) Inventors: Ralf Winkelmann, Holzgerlingen (DE); Michael Fee, Cold Spring, NY (US); Matthias Klein, Poughkeepsie, NY (US); Carsten Otte, Stuttgart (DE); Edward W. Chencinski, Poughkeepsie, NY (US); Hanno Eichelberger, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 16/407,782

(22) Filed: May 9, 2019

(65) Prior Publication Data
US 2020/0356418 A1 Nov. 12, 2020

(51) Int. Cl.
*G06F 9/52* (2006.01)
*G06F 9/54* (2006.01)
(Continued)

(52) U.S. Cl.
CPC ............. *G06F 9/522* (2013.01); *G06F 9/544* (2013.01); *G06F 9/546* (2013.01); *G06F 12/084* (2013.01); *G06F 12/0842* (2013.01)

(58) Field of Classification Search
CPC .......... G06F 9/522; G06F 9/544; G06F 9/546; G06F 12/084; G06F 12/0842
See application file for complete search history.

(56) References Cited

U.S. PATENT DOCUMENTS 5,682,537 A 10/1997 Davies
7,571,270 B1 8/2009 Nemirovsky
(Continued)

FOREIGN PATENT DOCUMENTS

CN 109684358 A1 11/2021
WO 2013062561 A1 5/2013
(Continued)

OTHER PUBLICATIONS

Walters, Craig R., et al. "Performance innovations in the IBM z14 platform." IBM Journal of Research and Development 62.2/3, pp. 1-11. (Year: 2018).*

(Continued)

*Primary Examiner* — Meng Ai T An
*Assistant Examiner* — Willy W Huaracha
(74) *Attorney, Agent, or Firm* — Robert R. Aragona

(57) ABSTRACT

The present disclosure relates to a method for a computer system comprising a plurality of processor cores including a first processor core and a second processor core, wherein a data item is exclusively assigned to the first processor core, of the plurality of processor cores, for executing an atomic primitive by the first processor core. The method includes receiving by the first processor core, from the second processor core, a request for accessing the data item, and in response to determining by the first processor core that the executing of the atomic primitive is not completed by the first processor core, returning a rejection message to the second processor core.

13 Claims, 3 Drawing Sheets

(51) Int. Cl.
*G06F 12/0842* (2016.01)
*G06F 12/084* (2016.01)

(56) References Cited

U.S. PATENT DOCUMENTS

| | | | |
|---|---|---|---|
| 8,108,610 B1* | 1/2012 | Glasco | G06T 1/20 |
| | | | 712/214 |
| 8,533,395 B2 | 9/2013 | O'Connor et al. | |
| 9,201,802 B1 | 12/2015 | Armangau | |
| 9,239,795 B2 | 1/2016 | Agarwal et al. | |
| 9,329,890 B2 | 5/2016 | Busaba et al. | |
| 9,678,806 B2 | 6/2017 | Che et al. | |
| 9,697,121 B2 | 7/2017 | Bradbury et al. | |
| 2002/0046230 A1 | 4/2002 | Dieterich | |
| 2003/0018785 A1 | 1/2003 | Eshel | |
| 2008/0082794 A1* | 4/2008 | Yu | G06F 9/3855 |
| | | | 712/218 |
| 2009/0019098 A1 | 1/2009 | Gunda | |
| 2012/0054760 A1 | 3/2012 | Chung | |
| 2012/0215984 A1 | 8/2012 | Hady et al. | |
| 2013/0014120 A1* | 1/2013 | Ross | G06F 9/526 |
| | | | 718/104 |
| 2015/0046655 A1* | 2/2015 | Nystad | G06F 9/3824 |
| | | | 711/125 |
| 2015/0301871 A1 | 10/2015 | Duvuru et al. | |
| 2016/0004639 A1* | 1/2016 | Vorbach | G06F 12/0893 |
| | | | 711/122 |
| 2016/0188466 A1 | 6/2016 | Hady et al. | |
| 2017/0116119 A1 | 4/2017 | Shum et al. | |
| 2017/0177499 A1 | 6/2017 | Guthrie | |
| 2017/0242797 A1* | 8/2017 | Wang | G06F 12/0831 |
| 2017/0286115 A1 | 10/2017 | Coleman | |
| 2018/0018097 A1 | 1/2018 | Kazakov | |
| 2018/0173625 A1* | 6/2018 | Moudgill | G06F 9/526 |
| 2018/0196751 A1* | 7/2018 | Giamei | G06F 12/0815 |
| 2018/0293114 A1* | 10/2018 | Mukherjee | G06F 9/524 |
| 2019/0340124 A1* | 11/2019 | Khan | G06F 9/526 |

FOREIGN PATENT DOCUMENTS

| | | |
|---|---|---|
| WO | 2018059655 A1 | 4/2018 |
| WO | 2020053126 A1 | 3/2020 |

OTHER PUBLICATIONS

Pan, "Performance Modeling of Multi-Core Systems: Caches and Locks," Digital Comprehensive Summaries of Uppsala Dissertations from the Faculty of Science and Technology, 2016, p. 1-58, Uppsala University.

Zheng et al., "A Parallel Page Cache: IOPS and Caching for Multicore Systems," HotStorage'12: Proceedings of the 4th USENIX Workshop on Hot Topics in Storage and File Systems, Jun. 13-14, 2012, p. 1-6, Boston, MA.

Woolbright, "Instruction Formats", 2016 [retrieved from internet Dec. 1, 2021, 4 pages. https://web.archive.org/web/20190717132902fw_/http://csc.columbusstate.edu/wollbright/instorg.htm.

Woolbright, "Load and Test Register", 2016, 2 Pages. https://web.archive.org/web/20150420181452/http://csc.columbusstate.edu/woolbright/Instructions/LTR.pdf https://web.archive.org/web/20150420181452/http://csc.columbusstate.edu/woolbright/INSTORG.HTM, (Year: 2015).

* cited by examiner

METHOD AND PROCESSOR SYSTEM FOR EXECUTING A TELT INSTRUCTION TO ACCESS A DATA ITEM DURING EXECUTION OF AN ATOMIC PRIMITIVE

BACKGROUND

The present invention relates to the field of digital computer systems, and more specifically, to a method for executing an atomic primitive by a processor core.

In concurrent programming, concurrent accesses to shared resources can lead to unexpected or erroneous behavior, so parts of a program where the shared resource is accessed may be protected. This protected section may be referred to as an atomic primitive, critical section or critical region. The atomic primitive may access a shared resource, such as a data structure that would not operate correctly in the context of multiple concurrent accesses. However, there is a need to better control the usage of an atomic primitive in a multi-core processor.

SUMMARY

Various embodiments provide a method for executing an atomic primitive by a core processor, and processor system as described by the subject matter of the independent claims. Advantageous embodiments are described in the dependent claims. Embodiments of the present invention can be freely combined with each other if they are not mutually exclusive.

In one aspect, the present disclosure relates to a method for a computer system comprising a plurality of processor cores, wherein a data item is assigned exclusively to a first processor core, of the plurality of processor cores, for executing an atomic primitive by the first processor core. The method includes receiving by the first processor core, from a second processor core, a request for accessing the data item, and in response to determining by the first processor core that the atomic primitive is not completed by the first processor core, returning a rejection message to the second processor core.

In exemplary embodiments, the method further includes returning a rejection message via the cache controller, wherein the request is received at the first processor core.

In exemplary embodiments, the method further includes receiving the request at the cache controller, sending by the cache controller an invalidation request of the data item to the first processor core, receiving from the first processor core by the cache controller a rejection message indicative of a negative response to the invalidation request, and forwarding, by the cache controller, the rejection message to the second processor core.

In exemplary embodiments, the method further includes determining that a store queue, or load queue, of the first processor core comprises an instruction referring to the requested data item, wherein the determining by the first processor core that the executing of the atomic primitive is not completed.

In exemplary embodiments, the method further includes returning the data item to the second processor core, in response to determining that the atomic primitive is completed.

In exemplary embodiments, wherein returning the rejection message to the second processor core further comprises: causing the second processor core to execute one or more further instructions while the atomic primitive is being executed, wherein the one or more further instructions are different from an instruction for requesting the data item.

In another aspect, the present disclosure relates to a processor system comprising a first processor core. The first processor core is configured for receiving, from a second processor core, a request for accessing the data item, and in response to determining that the execution of an atomic primitive is not completed by the first processor core, returning a rejection message to the second processor core. The data item is assigned exclusively to the first processor core, of the plurality of processor cores, for executing an atomic primitive by the first processor core.

In another aspect, the present disclosure relates to a computer program product comprising one or more computer readable storage mediums collectively storing program instructions that are executable by a processor or programmable circuitry to cause the processor or the programmable circuitry to perform a method for a computer system comprising a plurality of processor cores, wherein a data item is assigned exclusively to a first processor core, of the plurality of processor cores, for executing an atomic primitive by the first processor core; the method comprising: receiving by the first processor core, from the second processor core, a request for accessing the data item, and in response to determining, by the first processor core, that the executing of the atomic primitive is not completed by the first processor core, returning a rejection message to the second processor core.

BRIEF DESCRIPTION OF THE SEVERAL VIEWS OF THE DRAWINGS

In the following embodiments the invention is explained in greater detail, by way of example only, referring to the drawings in which.

DETAILED DESCRIPTION

Figure 1:
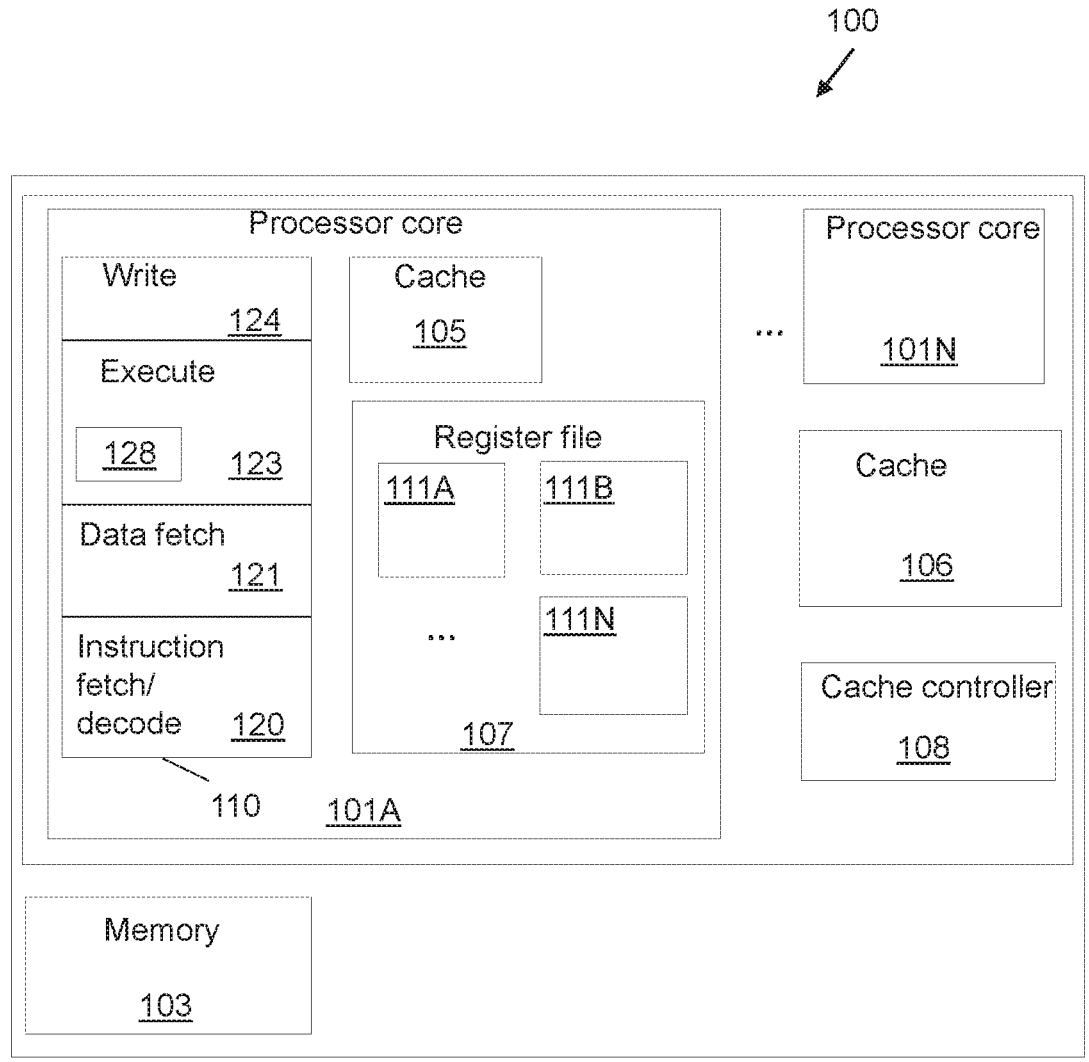
FIG. 1 depicts an example multiprocessor system, in accordance with embodiments of the present disclosure.

The descriptions of the various embodiments of the present invention will be presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The present disclosure may prevent that, when a given processor core enters an atomic primitive, other processor cores do not have to wait (e.g., by continuously requesting for a lock) for the given processor core until it completes the atomic primitive. The other processor cores may perform other tasks while the atomic primitive is being executed.

This may enable an efficient use of the processor resources. The terms "core" and "processor core" are used interchangeably herein.

The first core may communicate (e.g., by receiving the request and returning the rejection message) directly with the second core. This direct communication between cores may, for example, be implemented in a peer to peer communication enabling environment.

The atomic primitive may be defined by a storage location and a set of one or more instructions. The set of one or more instructions may have access to the storage location. The storage location may be associated with a lock that limits access to that location. To enter the atomic primitive the lock must be acquired. Once acquired, the atomic primitive is executed (i.e., the set of instructions are executed) exclusively by a core that acquired the lock. Once the lock is released this indicates that the core has left the atomic primitive.

According to one embodiment, the request is received at the first core via a cache controller and the returning of the rejection messages is performed via the cache controller. For example, the second core sends a request to the cache controller and the cache controller forwards the received request to the first core. The first core sends the rejection message to the cache controller and the cache controller forwards the rejection message to the second core.

According to one embodiment, the determining by the first core that the executing of the atomic primitive is not completed comprises determining that a store queue or load queue of the first processor core comprises an instruction referring to the requested data item. For example, the first core may comprise a logic in addition to the load/store queue that is configured to decide on rejecting the received request.

According to one embodiment, the determining that the store queue or the load queue of the first processor core comprises the requested data item is performed using a store compare logic and load compare logic of the first processor core respectively.

According to one embodiment, the request for accessing the data item is a tagged request indicating that it is a request for data being used in the atomic primitive, wherein the first core comprises a logic circuitry configured for recognizing the tagged request, wherein the determining step is performed in case the first core recognizes the tagged request.

According to one embodiment, the method comprises receiving the request at the cache controller, sending by the cache controller an invalidation request of the data item to the first core, receiving from the first core by the cache controller a rejection message indicative of a negative response to the invalidation request and forwarding by the cache controller the rejection message to the second core.

According to one embodiment, the method further comprises, in response to determining that the atomic primitive is completed, returning the data item to the second (waiting) core. This may enable the second processor core to receive the requested data item without having to perform repeated requests.

According to one embodiment, returning the rejection message to the second core further comprises: causing the second core to execute one or more further instructions while the atomic primitive is being executed, the further instructions being different from an instruction for requesting the data item. This may enable an efficient use of the processor resources compared to the case with the second core has to wait for the first core until it finished the execution of the primitive.

According to one embodiment, the data item is a lock acquired by the first core to execute the atomic primitive, wherein determining that the execution of the atomic primitive is not completed comprises determining that the lock is not available. This embodiment may seamlessly be integrated in existing systems.

According to one embodiment, the cache line associated with the data item is released after the execution of the atomic primitive is completed.

According to one embodiment, the data item is cached in a cache of the first core.

According to one embodiment, the data item is cached in a cache shared between the first and second cores. The cache may be a data cache or instruction cache.

According to one embodiment, the method further comprises providing a processor instruction, wherein the receiving of the request is the result of executing the processor instruction by the second core, wherein the determining and returning steps are performed in response to determining that the received request is triggered by the processor instruction.

The processor instruction may be named Tentative Exclusive Load&Test (TELT). The TELT instruction may be issued by the core in the same way as a Load&Test instruction. The TELT instruction can either return the cache line and do a test or can get a reject response. The reject response does not return the cache line data and therefore does not install it in the cache. Instead, the reject response is treated in the same way as if the Load&Test instruction failed. The TELT instruction may be beneficial as it may work with stiff-arming, because it is non-blocking (providing a reject response without changing a cache line state). Another advantage may be that it may provide a faster response to the requesting core such that it enables other cores to work on other tasks. Another advantage is that the TELT instruction does not steal the cache line from the lock owner (e.g., no exclusive fetch prior to unlock is needed). For example, the received request at the first core may be a fetch-request sent via a bus by the second core when executing the "TELT" instruction by the second core.

The TELT instruction may have an RX or RXE format such as the LOAD instruction. In case the data specified by the second operand of the TELT instruction is available, the data is placed at the first operand of the TELT instruction. The contents of the first operand are unspecified in case the data is not available. The resulting condition codes of the TELT instruction may be as follows: "0" indicates that the result is zero; "1" indicates that the result is less than zero; "2" indicates that the result is greater than zero and "3" indicates that the data is not available. In a typical programming sequence, depending on the condition code, the result will be processed accordingly later.

The TELT instruction may be provided as part of the instruction set architecture (ISA) associated with the processor system.

FIG. 1 depicts an example multiprocessor system 100, in accordance with embodiments of the present disclosure. The multiprocessor system 100 comprises multiple processor cores 101A-N. The multiple processor cores 101A-N may for example reside on a same processor chip such as an International Business Machines (IBM) central processor (CP) chip. The multiple processor cores 101A-N may, for example, share a cache 106 that resides on the same chip. The multiprocessor system 100 further comprises a main memory 103. For simplification of the description, only components of the processor core 101A are described herein; the other processor cores 101B-N may have a similar structure.

The processor core 101A may comprise a cache 105 associated with the processor core 101. The cache 105 is employed to buffer memory data to improve processor performance. The cache 105 is a high speed buffer holding cache lines of memory data that are likely to be used (e.g., cache 105 is configured to cache data of the main memory 103). Typical cache lines are 64, 128 or 256 bytes of memory data. The processor core cache maintains metadata for each line it contains identifying the address and ownership state.

The processor core 101A may comprise an instruction execution pipeline 110. The execution pipeline 110 may include multiple pipeline stages, where each stage includes a logic circuitry fabricated to perform operations of a specific stage in a multi-stage process needed to fully execute an instruction. Execution pipeline 110 may include an instruction fetch and decode unit 120, a data fetch unit 121, an execution unit 123, and a write back unit 124.

The instruction fetch and decode unit 120 is configured to fetch an instruction of the pipeline 110 and to decode the fetched instruction. Data fetch unit 121 may retrieve data items to be processed from registers 111A-N. The execution unit 123 may typically receive information about a decoded instruction (e.g., from the fetch and decode unit 120) and may perform operations on operands according to the opcode of the instruction. The execution unit 123 may include a logic circuitry to execute instructions specified in the ISA of the processor core 101A. Results of the execution may be stored either in memory 103, registers 111A-N or in other machine hardware (such as control registers) by the write unit 124.

The processor core 101A may further comprise a register file 107 comprising the registers 111A-111N associated with the processor core 101. The registers 111A-N may for example be general purpose registers that each may include a certain number of bits to store data items processed by instructions executed in pipeline 110.

The source code of a program may be compiled into a series of machine-executable instructions defined in an ISA associated with processor core 101A. When processor core 101A starts to execute the executable instructions, these machine-executable instructions may be placed on pipeline 110 to be executed sequentially. Instruction fetch and decode unit 120 may retrieve an instruction placed on pipeline 110 and identify an identifier associated with the instruction. The instruction identifier may associate the received instruction with a circuit implementation of the instruction specified in the ISA of processor core 101A.

The instructions of the ISA may be provided to process data items stored in memory 103 and/or in registers 111A-N. For example, an instruction may retrieve a data item from the memory 103 to a register 111A-N. Data fetch unit 121 may retrieve data items to be processed from registers 111A-N. Execution unit 123 may include logic circuitry to execute instructions specified in the ISA of processor core 101A. After execution of an instruction to process data items retrieved by data fetch unit 121, write unit 124 may output and store the results in registers 111A-N.

An atomic primitive 128 can be constructed from one or more instructions defined in the ISA of processor core 101A. The primitive 128 may for example include a read instruction executed by the processor core, and it is guaranteed that no other processor core 101B-N can access and/or modify the data item stored at the memory location read by the read instruction until the processor core 101A has completed the execution of the primitive.

The processor cores 101A-N share processor cache 106 for main memory 103. The processor cache 106 may be managed by a cache controller 108.

Figure 2A:
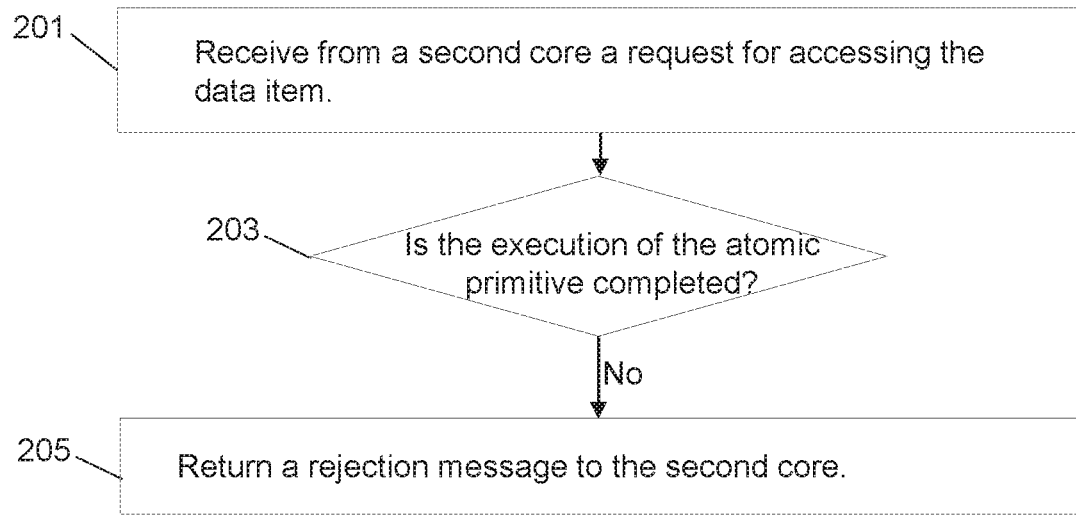
FIG. 2A depicts a flowchart of a method for processing data requests of multiple processor cores, in accordance with embodiments of the present disclosure.

FIG. 2A depicts a flowchart of a method for processing data requests of multiple processor cores (e.g., 101A-N), in accordance with embodiments of the present disclosure.

For example, one first processor core (e.g., 101A) is assigned exclusively a data item for executing an atomic primitive (e.g., 128). For example, the data item may be protected by the atomic primitive to prevent two processes from changing the content of the data item concurrently. Once entering the atomic primitive, other cores are prevented from accessing data protected by the atomic primitive and a set of one or more instructions are executed (e.g., the set of instructions have access to the protected data). Once the set of instructions are finished, the atomic primitive is left. Entering an atomic primitive may be performed by acquiring a lock and leaving the atomic primitive may be performed by releasing the lock. The releasing of the lock may, for example, be triggered by a store instruction of the set of instructions. The set of instructions may be part of the atomic primitive.

In step 201, a request for accessing the data item is received at the first processor core 101A from a second processor core (e.g., one of the remaining processor cores 101B-N). The request may be received by the first core directly from the second core or via a cache controller 108.

In a first example, the request may be received by the first core directly from the second core in a peer to peer communication mode. Each of the processor cores may be enabled with an interface that supports a direct data exchange between the cores.

In a second example, the request may be received at the first core via the cache controller. The cache controller may comprise a logic circuitry that enables the cache controller to operate in accordance with a predefined cache protocol. The cache protocol may be indicative of multiples possible states of the cache controller, wherein each state of the multiple states is associated with respective actions to be performed by the cache controller. For example, when the cache controller is in a first state of the multiple states, whenever there is any request from a processor core of the processor cores to access data, the cache controller will check whether it is a request that is triggered by the TELT instruction. The cache controller may, for example, be in the first state in step 201. Upon receiving the request and determining that the request is triggered by the TELT instruction, the cache controller may jump to or switch to a second state of the multiple states in accordance with the cache protocol. In the second state, the cache controller may send an invalidation request to the first processor core for invalidating the requested data item at the first processor core. In order to send the invalidation request, in the second state, the cache controller may determine if the requested data item is in a state suitable for transfer of line ownership to the processor core requesting it or not. For example, the cache controller maintains a state for the cache lines that it holds. For example, the requested data item may be in a state indicating that the first processor core has the target data item exclusive, but that the execution of the atomic primitive is not complete.

In response to determining (inquiry step 203) that the execution of the atomic primitive is not completed by the first processor core 101A, the processor core 101A may generate a rejection message and send the rejection message to the second core in step 205. The rejection message may be sent by the first core directly to the second core or may be sent via the cache controller 108 to the second core. For example, the request for accessing the data item is a tagged request indicating that it is a request for data being used in the atomic primitive, wherein the first core comprises a logic circuitry configured for recognizing the tagged request, wherein the determining step 203 is performed in case the first core recognizes the tagged request.

The determining by the first core that the execution of the atomic primitive is not completed may be performed by determining that a store queue, or load queue, of the first processor core comprises an instruction referring to the requested data item. If the queue has an instruction referring to the requested data item, this may indicate that the first processor core is still executing the atomic primitive. For example, the determining that the store queue or the load queue of the first processor core comprises the requested data item may be performed using a store compare logic and load compare logic of the first processor core respectively. This may enable a seamless integration of the present method into the existing systems.

Following the second example (in which the cache controller is used as an intermediate), the cache controller may jump to or switch, upon sending the invalidation request, to a third state of the multiple states in accordance with the cache protocol. In the third state, the cache controller may wait for the response of the first processor core to the invalidation request. Upon receiving from the first core a response indicating that the requested data is not available, the cache controller may switch to a fourth state of the multiple states in accordance with the cache protocol. In the fourth state, the cache controller may send a response to the second core indicating that the data is not available.

Figure 2B:
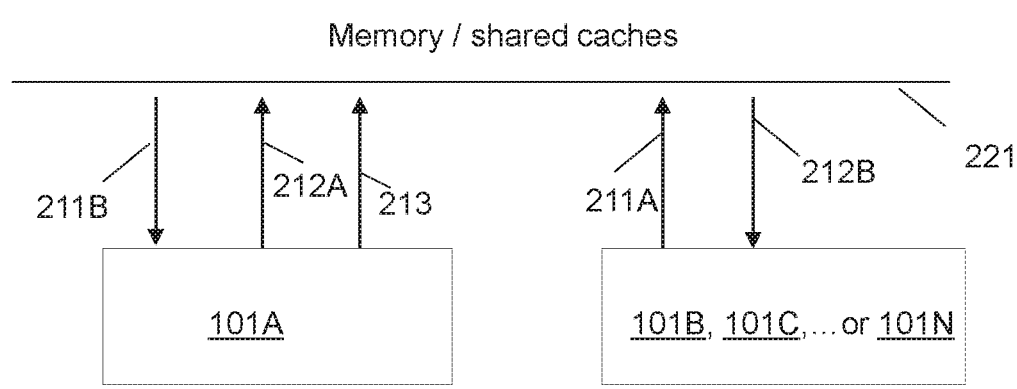
FIG. 2B is a block diagram illustrating a method for processing data requests of multiple processor cores, in accordance with embodiments of the present disclosure.

FIG. 2B is a block diagram illustrating a method for processing data requests of multiple processor cores 101A-N, in accordance with embodiments of the present disclosure. The processor core 101A may be assigned exclusively a data item for executing an atomic primitive. While executing the atomic primitive, another processor core 101B, 101C . . . or 101N may send (211A) a request to access the data item. That request may, for example, be sent via a bus 221 when executing the TELT instruction. By monitoring the bus 221, the cache controller may receive the request of the second core. Upon receiving via the bus 221, the submitted request, the cache controller may send (211B) a conditional invalidation request. The conditional invalidation request may be a tagged request indicating that the data to be invalidated is the data of the atomic primitive.

Upon receiving the conditional invalidation request, the processor core 101A may determine if its state is suitable for transferring the requested data item. Since the processor core 101A is owning the cache line of the requested data item, the processor core 101A may determine if its state is suitable for transferring the requested data item based, for example, on information from instructions recently retried, instructions currently in flight, instructions waiting to be dispatched, or from instruction hints, such as "next instruction access intent".

Since the processor core 101A is still executing the atomic primitive, that state is not suitable for data transfer and thus the processor core 101A may send (212A) to the cache controller a rejection message indicative of a negative response to the conditional invalidation request. For example, the generated rejection message may come from two source categories. The first category may cover the following rejection messages: -reject due to store queue compare; -reject due to load queue compare; -reject due to forward progress mechanism; and other reject reasons which can be derived differently from the above rejection messages. The second category may cover specific rejects which may improve the semaphore locking efficiency. A first example may be a NIAI-8 instruction followed by a compare and swap (long stiff-arming) instruction. For example, the lock owner rejects a request to the cache line until either releasing the stiff-arm via a NIAI7 instruction, followed by an unlock (store), or a timeout occurs. A second example may be a NIAI instruction before a Load&Test of the TELT instruction to provide a short term stiff-arming (e.g., a programmable delay in which requests for other cores will be rejected, may be in the range of 128 to 2048 processor cycles).

The cache controller may then send (212B) a rejection message to the initiating processor core that executed the TELT instruction indicating that the requested data is not available. As illustrated in FIG. 2B, after completing the execution of the primitive 128, the processor core 101A may release (213) the data item that is assigned to it.

In one example, a hot-line table may be used by the first core 101A. The hot-line table may be a mechanism that is implemented in hardware to let the first core detecting cache lines that are intensively used across multiple processor cores. After a cache line has been classified as being 'hot', cache accesses for that cache line to the shared caches (e.g., in z system, the shared cache may have a level beyond L2) may be controlled differently. For example, processors may execute instructions in an out-of-order mode. As a consequence, memory accesses for operands (and instructions) are done based on branch predictions. For hot lines, this may be prevented. The memory access to a hot line may be prevented until it is confirmed that it is not a branch wrong path. The hot-line table may thus help to eliminate spurious memory access for hot lines if it is on a wrong predicted branch.

Figure 3:
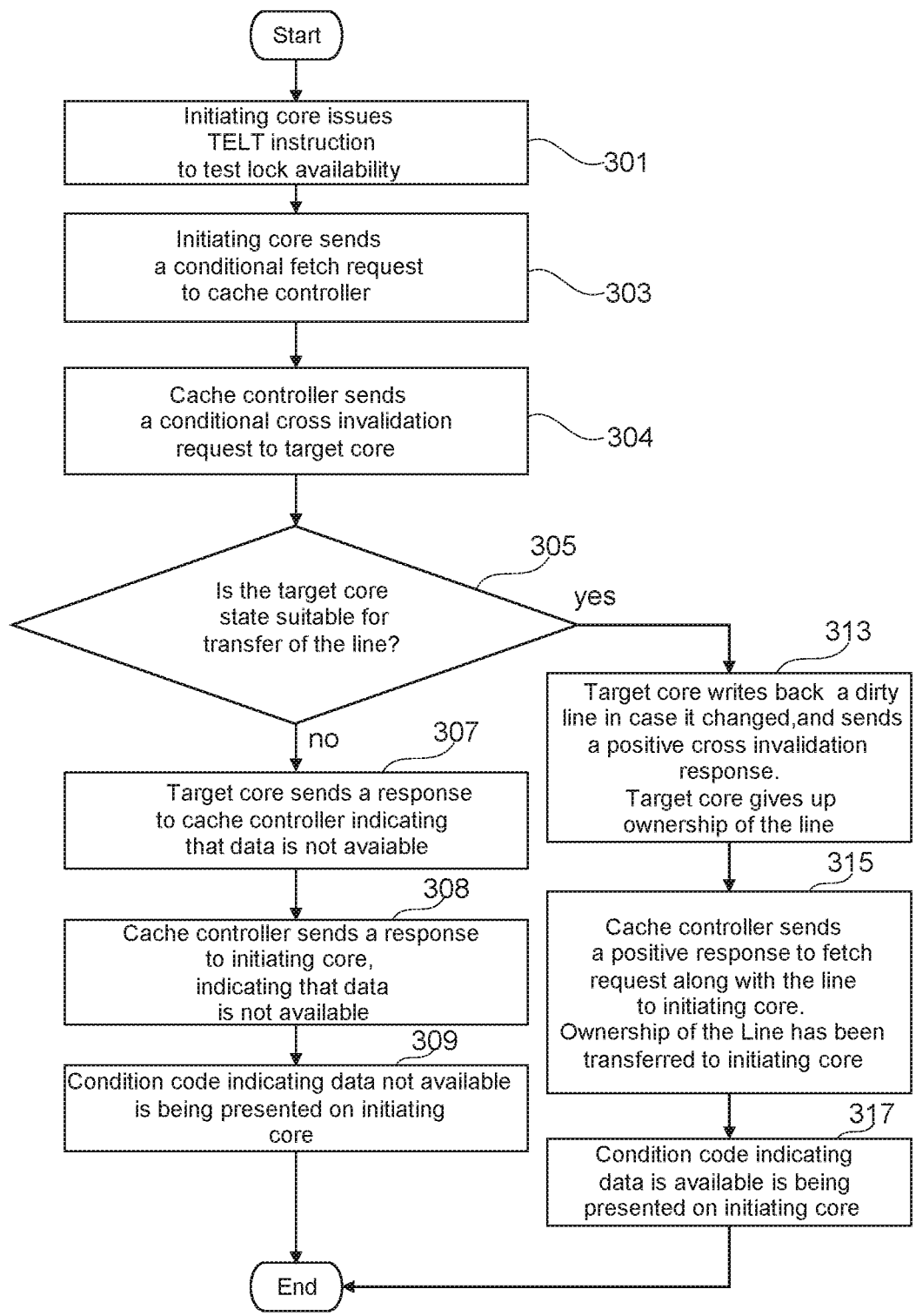
FIG. 3 depicts a flowchart of a method to implement a lock for workload distribution in a computer system comprising a plurality of processor cores, in accordance with embodiments of the present disclosure.

FIG. 3 depicts a flowchart of a method to implement a lock for workload distribution in a computer system comprising a plurality of processor cores, in accordance with embodiments of the present disclosure.

In step 301, an initiating processor core 101B may issue the TELT instruction to test lock availability of a lock that is associated with an atomic primitive being executed by a target processor core 101A. This may cause the initiating processor core 101B to send in step 303 a conditional fetch request for a cache line to the cache controller 108. In response to receiving the conditional fetch request, the cache controller 108 may send, in step 304, a cross invalidation request to the target processor core 101A.

If it is determined by the target processor core 101A (inquiry step 305) that the state of the requested cache line is not suitable for transfer, the target processor core 101A sends in step 307 a response (rejection message) to the cache controller 108 indicating that data is not available. In response to receiving the response, the cache controller 108 sends in step 308 a response (rejection message) to the initiating processor core 101B indicating that data is not available. In step 309, a condition code indicating that the data is not available may be presented on the initiating processor core 101B.

If it is determined by the target processor core 101A (inquiry step 305) that the state of the requested cache line is suitable for transfer, the target processor core 101A writes back in step 313 a dirty line in case the line is changed and sends a positive cross invalidation response, thereby the target core processor 101A gives up ownership of the requested cache line. In step 315, the cache controller 108 sends a positive response to the fetch request to the initiating processor core 101B along with the cache line. The ownership of the cache line is transferred to the initiating processor core 101B. In step 317, a condition code indicating that the data is available may be presented on the initiating processor core 101B.

In another example, a method is provided for implementing a lock for workload distribution in a computer system comprising a plurality of processor cores, the plurality of processor cores sharing a processor cache for a main memory, and the processor cache being managed by a cache controller. The method comprises: in response to a tentative exclusive load and test instruction for a main memory address, a processor core sending a conditional fetch request for the main memory address to the cache controller; in response to a conditional fetch request for a main memory address from an initiating processor core, the cache controller sending a conditional cross invalidation request to the target processor core currently owning the cache line for the main memory address; in response to a cross invalidation request for a main memory address from the cache controller, the target processor core determining if ownership of the cache line for the main memory address can be transferred, and if not responding to the cache controller that the data is not available, otherwise writing back the cache line in case it was changed, releasing ownership of the cache line and responding to the cache controller with a positive cross invalidation request; in response to a positive cross invalidation request from the target processor core, the cache controller responding to the initiating processor core with the released cache line, otherwise responding to the initiating processor that the data is not available.

Various embodiments are specified in the following numbered clauses.

1. A method for a computer system comprising a plurality of processor cores comprising a first core and a second core, wherein a data item is exclusively assigned to the first core of the processor cores for executing an atomic primitive by the first core; the method comprising receiving by the first core, from the second core, a request for accessing the data item, and in response to determining by the first core that the executing of the atomic primitive is not completed by the first core, returning a rejection message to the second core.

2. The method of clause 1, wherein the request is received at the first core, via a cache controller, and the returning of the rejection message is performed via the cache controller.

3. The method of clause 2, comprising receiving the request at the cache controller, sending by the cache controller an invalidation request of the data item to the first core, receiving from the first core by the cache controller a rejection message indicative of a negative response to the invalidation request and forwarding by the cache controller the rejection message to the second core.

4. The method of any of the preceding clauses, the determining by the first core that the executing of the atomic primitive is not completed comprises determining that a store queue or load queue of the first processor core comprises an instruction referring to the requested data item.

5. The method of clause 4, wherein the determining that the store queue or the load queue of the first processor core comprises the requested data item is performed using a store compare logic and load compare logic of the first processor core respectively.

6. The method of any of the preceding clauses, wherein the request for accessing the data item is a tagged request indicating that it is a request for data being used in the atomic primitive, wherein the first core comprises a logic circuitry configured for recognizing the tagged request, wherein the determining step is performed in case the first core recognizes the tagged request.

7. The method of any of the preceding clauses, further comprising in response to determining that the atomic primitive is completed, returning the data item to the second core.

8. The method of any of the preceding clauses, the determining by the first core that the executing of the atomic primitive is not completed by the first core being performed using predefined rejection messages.

9. The method of any of the preceding clauses, wherein returning the rejection message to the second core further comprises: causing the second core to execute one or more further instructions while the atomic primitive is being executed, the further instructions being different from an instruction for requesting the data item.

10. The method of any of the preceding clauses, wherein the data item is a lock acquired by the first core to execute the atomic primitive, wherein determining that the execution of the atomic primitive is not completed comprises determining that the lock is not available.

11. The method of any of the preceding clauses, wherein the cache line is released after the execution of the atomic primitive is competed.

12. The method of any of the preceding clauses, wherein the data item is cached in a cache of the first core.

13. The method of any of the preceding clauses 1-11, wherein the data item is cached in a cache shared between the first and second cores.

14. The method of any of the preceding clauses, further comprising providing a processor instruction, wherein the receiving of the request is the result of executing the processor instruction by the second core, wherein the determining and returning steps are performed in response to determining that the received request is triggered by the processor instruction.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a computer system comprising a multi-core processor having a cache controller that operates in a plurality states, and wherein the multi-core processor comprises a first processor core and a second processor core, and a data item is exclusively assigned to the first processor core for executing an atomic primitive by the first processor core, the method comprising:

executing a tentative exclusive load and test (TELT) instruction by the second processor core, wherein the TELT instruction is executed by the second processor core while the data item is exclusively assigned to the first processor core;

receiving by the first processor core, from the second processor core via the cache controller in a first state of the plurality of states, a request for accessing the data item, wherein the receiving of the request is a result of the execution of the TELT instruction by the second processor core while the data item is exclusively assigned to the first processor core, wherein the execution of the TELT instruction by the second processor core tags the request indicating that the request is for data being used in the atomic primitive, wherein the first processor core comprises a logic circuitry configured for recognizing the tagged request;

sending, by the cache controller in a second state of the plurality of states, an invalidation request to the first processor core to invalidate the requested data item at the first processor core, wherein the cache controller changes from the first state to the second state upon determining the request for accessing the data item is triggered by the execution of the TELT instruction by the second processor core;

in response to determining, by the first processor core, that the executing of the atomic primitive is not completed by the first processor core when a store queue, or load queue of the first processor core comprises an instruction referring to the requested data item, receiving from the first processor core via the cache controller in a third state of the plurality of states, a response that the requested data item is not available, wherein the cache controller changes from the second state to the third state and waits for the response upon sending the invalidation request to the first processor core;

returning a rejection message to the second processor core via the cache controller in a fourth state of the plurality of states, wherein the determining that the executing of the atomic primitive is not completed and the returning are performed in response to the first processor core determining that the received request from the second processor core is triggered by the execution of the TELT instruction, wherein the cache controller changes from the third state to fourth the state upon receiving the response that the requested data item is not available; and in response to determining that the atomic primitive is completed, returning via the cache controller the data item to the second processor core.

2. The method of claim 1, wherein the determining that the store queue, or the load queue, of the first processor core comprises the requested data item is performed using a store compare logic or load compare logic of the first processor core, respectively.

3. The method of claim 1, wherein determining by the first processor core that the executing of the atomic primitive is not completed by the first processor core is performed using predefined rejection messages.

4. The method of claim 1, wherein returning the rejection message to the second processor core further comprises:
causing the second processor core to execute one or more further instructions while the atomic primitive is being executed, wherein the one or more further instructions are different from an instruction for requesting the data item.

5. The method of claim 1, wherein the data item is a lock acquired by the first processor core to execute the atomic primitive, and wherein determining that the execution of the atomic primitive is not completed comprises determining that the lock is not available.

6. The method of claim 1, wherein a cache line is released after the execution of the atomic primitive is completed.

7. The method of claim 1, wherein the data item is cached in a cache of the first processor core.

8. The method of claim 1, wherein the data item is cached in a cache shared between the first processor core and the second processor core.

9. A processor system comprising multi-core processor having a cache controller that operates in a plurality states, and wherein the multi-core processor comprises a first processor core and a second processor core, and a data item is assigned exclusively to the first processor core for executing an atomic primitive by the first processor core, the processor system capable of performing a method comprising:
executing a tentative exclusive load and test (TELT) instruction by a second processor core, wherein the TELT instruction is executed by the second processor core while the data item is exclusively assigned to the first processor core;
receiving by the first processor core, from the second processor core via the cache controller in a first state of the plurality of states, a request for accessing the data item, wherein the receiving of the request is a result of the execution of the TELT instruction by the second processor core while the data item is exclusively assigned to the first processor core, wherein the execution of the TELT instruction by the second processor core tags the request indicating that the request is for data being used in the atomic primitive, wherein the first processor core comprises a logic circuitry configured for recognizing the tagged request;

sending, by the cache controller in a second state of the plurality of states, an invalidation request to the first processor core to invalidate the requested data item at the first processor core, wherein the cache controller changes from the first state to the second state upon to determining the request for accessing the data item is triggered by the execution of the TELT instruction by the second processor core;

in response to determining, by the first processor core, that the executing of the atomic primitive is not completed by the first processor core when a store queue, or load queue of the first processor core comprises an instruction referring to the requested data item, receiving from the first processor core via the cache controller in a third state of the plurality of states, a response that the requested data item is not available, wherein the cache controller changes from the second state to the third state and waits for the response upon sending the invalidation request to the first processor core;

returning a rejection message to the second processor core via the cache controller in a fourth state of the plurality of states, wherein the determining that the executing of the atomic primitive is not completed and the returning are performed in response to the first processor core determining that the received request from the second processor core is triggered by the execution of the TELT instruction, wherein the cache controller changes from the third state to fourth the state upon receiving the response that the requested data item is not available; and in response to determining that the atomic primitive is completed, returning via the cache controller the data item to the second processor core.

10. The processor system of claim 9, wherein the second processor core includes a logic circuitry to execute a predefined instruction, and wherein the first processor core is configured to perform the determining step in response to the execution of the predefined instruction by the logic circuitry.

11. The processor system of claim 9, wherein the determining that the store queue, or the load queue, of the first processor core comprises the requested data item is performed using a store compare logic or load compare logic of the first processor core, respectively.

12. A computer program product comprising one or more computer readable storage mediums collectively storing program instructions that are executable by a processor or programmable circuitry to cause the processor or the programmable circuitry to perform a method for a computer system comprising a multi-core processor having a cache controller that operates in a plurality states, and wherein the multi-core processor comprises a first processor core and a second processor core, and a data item is assigned exclusively to a first processor core for executing an atomic primitive by the first processor core;
the method comprising:
executing a tentative exclusive load and test (TELT) instruction by a second processor core, wherein the TELT instruction is executed by the second processor core while the data item is exclusively assigned to the first processor core;

receiving by the first processor core, from the second processor core via the cache controller in a first state of the plurality of states, a request for accessing the data item, wherein the receiving of the request is a result of the execution of the TELT instruction by the second processor core while the data item is exclusively assigned to the first processor core, wherein the execution of the TELT instruction by the second processor core tags the request indicating that the request is for data being used in the atomic primitive, wherein the first processor core comprises a logic circuitry configured for recognizing the tagged request;

sending, by the cache controller in a second state of the plurality of states, an invalidation request to the first processor core to invalidate the requested data item at the first processor core, wherein the cache controller changes from the first state to the second state upon to determining the request for accessing the data item is triggered by the execution of the TELT instruction by the second processor core;

in response to determining, by the first processor core, that the executing of the atomic primitive is not completed by the first processor core when a store queue, or load queue of the first processor core comprises an instruction referring to the requested data item, receiving from the first processor core via the cache controller in a third state of the plurality of states, a response that the requested data item is not available, wherein the cache controller changes from the second state to the third state and waits for the response upon sending the invalidation request to the first processor core; and returning a rejection message to the second processor core via the cache controller in a fourth state of the plurality of states, wherein the determining that the executing of the atomic primitive is not completed and the returning are performed in response to the first processor core determining that the received request from the second processor core is triggered by the execution of the TELT instruction, wherein the cache controller changes from the third state to fourth the state upon receiving the response that the requested data item is not available; and in response to determining that the atomic primitive is completed, returning via the cache controller the data item to the second processor core.

13. The computer program product of claim 12, wherein the determining that the store queue, or the load queue, of the first processor core comprises the requested data item is performed using a store compare logic or load compare logic of the first processor core, respectively.

* * * * *